(No Model.)
F. G. BEACH.
CIRCUIT CLOSER FOR ELECTRIC ANNUNCIATORS.
No. 245,931.　　　　　　　Patented Aug. 23, 1881.
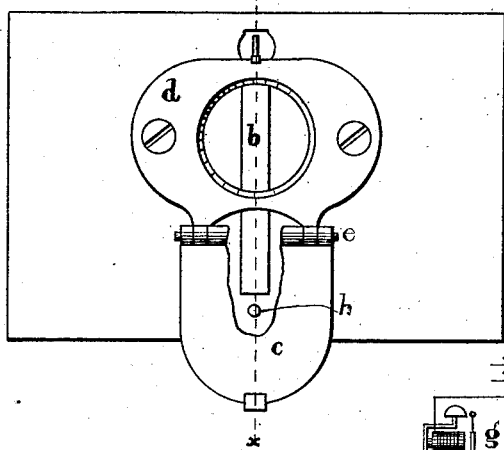
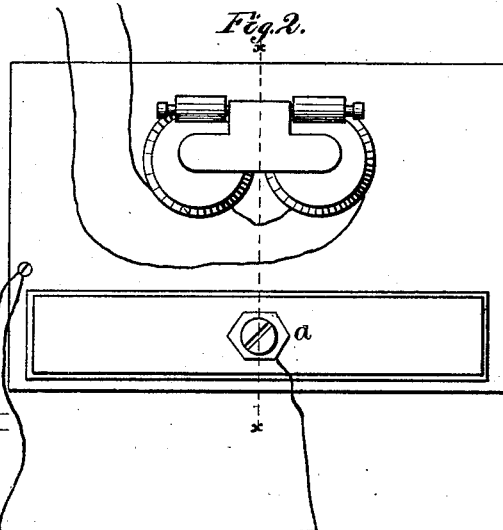
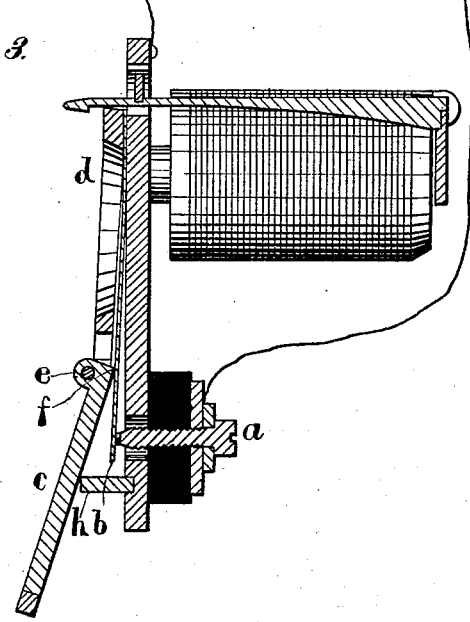
Witnesses.
Henry Frankfurter.
William S. Granger.
Inventor.
Franklin G. Beach
By George P. Barton
Attorney.

UNITED STATES PATENT OFFICE.

FRANKLIN G. BEACH, OF CHICAGO, ILLINOIS, ASSIGNOR TO THE WESTERN ELECTRIC MANUFACTURING COMPANY, OF SAME PLACE.

CIRCUIT-CLOSER FOR ELECTRIC ANNUNCIATORS.

SPECIFICATION forming part of Letters Patent No. 245,931, dated August 23, 1881.

Application filed July 1, 1881. (No model.)

*To all whom it may concern:*

Be it known that I, FRANKLIN G. BEACH, of Chicago, Illinois, have discovered certain new and useful Improvements in Circuit-Closers for Electric Annunciators, of which the following is a full, clear, concise, and exact description.

In the drawings, Figure 1 is a front elevation of an annunciator embodying my invention, in which a portion of the drop is broken away. Fig. 2 is a rear elevation thereof. Fig. 3 is a detail section of a similar annunciator, as indicated by lines X X of Figs. 1 and 2.

The annunciator-magnets are constructed in the usual manner and arranged upon an iron support, which may serve as a heel-piece and common ground-connections for the lines passing through the electro-magnets.

I connect the insulated contact-points $a$ of any number of annunciators together and to one pole of the battery in the circuit of the signaling-instrument. The other pole of the battery may be grounded or connected with all springs or levers $b$ of all the annunciators. The spring $b$ is attached rigidly at its upper end and normally stands away from contact-point $a$. The drop $c$ is pivoted, as shown at point $e$, to the frame $d$ of the annunciator. The weight of the drop when falling crowds the eccentric $f$ against the spring with sufficient force to bring the spring $b$ into electric contact with contact-point $a$, as shown in Fig. 3. The circuit is thus closed to battery through the signaling-instrument $g$, which notifies the attendant that a shutter of the connected annunciators has been thrown down. The shutter, it will be seen, has an unobstructed fall until the eccentric touches the spring. The force thus acquired is brought to bear directly upon the spring, and the shutter acts as a lever, the portion between the pivot and the spring, which I have designated as eccentric $f$, being the shorter arm. The force of the falling drop is nearly spent before it is finally arrested by stop $h$.

I have found my invention of great advantage as a night-call in connection with the annunciators of a telephone-exchange system, where each subscriber's individual line is connected with a separate calling annunciator.

I claim—

1. The combination of contact-point $a$ and spring or lever $b$ with the shutter $c$ of an electric annunciator, said shutter being pivoted at $e$ and provided with eccentric $f$, whereby the circuit of a battery may be closed when the shutter falls, substantially as and for the purpose specified.

2. The combination of several electric annunciators, each provided with an insulated contact-point, $a$, the points $a$ of all the annunciators being connected with one pole of a battery, and springs or levers $b$, one for each annunciator, said springs $b$ being connected with the other pole of the battery, a signal-instrument, $g$, and shutters $c$ pivoted at $e$, one for each annunciator, whereby the circuit of the battery is closed through the signal-instrument when the shutter of an annunciator is thrown down.

FRANKLIN G. BEACH.

Witnesses:
LEROY B. FIRMAN,
GEORGE P. BARTON.